United States Patent
Connolly et al.

(10) Patent No.: US 11,460,370 B2
(45) Date of Patent: Oct. 4, 2022

(54) MULTI-AXIS VIBRATION TEST SYSTEM WITH SOLID ALUMINUM CUBE MOUNTING FIXTURE

(71) Applicant: Raytheon Company, Waltham, MA (US)

(72) Inventors: Robert C. Connolly, Tucson, AZ (US); Teri A. Elwood, Tucson, AZ (US); Edward M. Moore, II, Tucson, AZ (US); Bryan P. Taylor, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/176,954

(22) Filed: Feb. 16, 2021

(65) Prior Publication Data
US 2022/0260451 A1 Aug. 18, 2022

(51) Int. Cl.
*G01M 7/06* (2006.01)
*G01M 7/02* (2006.01)

(52) U.S. Cl.
CPC .............. *G01M 7/06* (2013.01); *G01M 7/022* (2013.01); *G01M 7/027* (2013.01)

(58) Field of Classification Search
CPC ........ G01M 7/06; G01M 7/022; G01M 7/027; G01M 7/00; G01M 7/08
See application file for complete search history.

(56) References Cited

U.S. PATENT DOCUMENTS

| | | | |
|---|---|---|---|
| 4,164,151 A * | 8/1979 | Nolan | G01M 7/027 73/663 |
| 4,783,999 A | 11/1988 | Kimball | |
| 4,875,374 A | 10/1989 | Pinson | |
| 5,156,051 A | 10/1992 | Marshall | |
| 5,343,752 A | 9/1994 | Woyski et al. | |
| 5,549,005 A | 8/1996 | Aoki et al. | |
| 6,112,596 A * | 9/2000 | Hess | G01M 7/06 73/663 |
| 6,810,741 B1 * | 11/2004 | Lafleur | G01M 7/022 73/579 |
| 6,860,152 B2 | 3/2005 | Lund et al. | |
| 7,255,008 B2 | 8/2007 | Fukushima et al. | |
| 9,482,593 B2 | 11/2016 | Khulief | |
| 2018/0321111 A1 * | 11/2018 | Matsumoto | G01M 7/027 |

(Continued)

OTHER PUBLICATIONS

"K-Series Electrodynamic Shakers (highest force air cooled system)", Retrieved from internet. URL: https: www.udco.com products electrodynamic-shaker-systems k-series , 5 pgs.

(Continued)

*Primary Examiner* — Suman K Nath
(74) *Attorney, Agent, or Firm* — Schwegman Lundberg & Woessner, P.A.

(57) ABSTRACT

A multi-axis vibration test system uses a mounting fixture formed from a solid block of Aluminum alloy, at least 20" per side, and machined to form bearing recesses that receive the pad bearings to overcome the problems of existing systems and deliver the required amplitude of linear displacement over the frequency test band in all three, and possibly six, axes simultaneously and uniformly over the mounting surface(s) for both commercial and the more stringent military standards.

21 Claims, 10 Drawing Sheets

(56) References Cited

U.S. PATENT DOCUMENTS

2019/0022478 A1\* 1/2019 Greaney ................ A63B 60/00
2020/0299108 A1\* 9/2020 Van Veluw ............. B66C 23/52

OTHER PUBLICATIONS

San Andres, Luis, "Hydrostatic Journal Bearings", Notes 12(b), (2010), 18 pgs.
Team Corporation, "TENSOR Multi Axis Test System", (Feb. 2012), 18 pgs.

\* cited by examiner

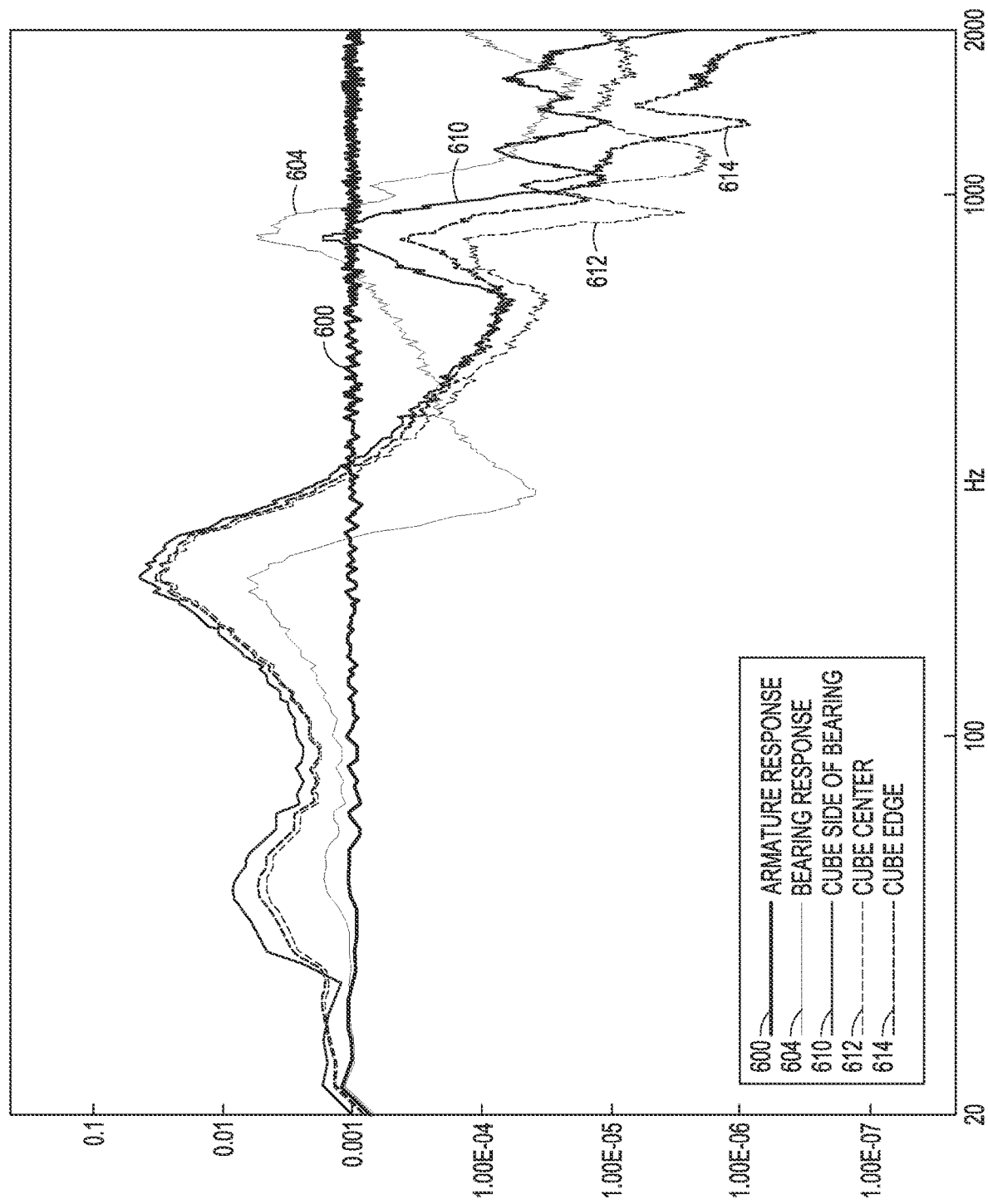

MULTI-AXIS VIBRATION TEST SYSTEM WITH SOLID ALUMINUM CUBE MOUNTING FIXTURE

FIELD OF THE INVENTION

This invention relates to the simulation of a vibration environment for testing devices that are subjected to vibration during use, and more particularly, to a multi-axis vibration test system that uses a machined solid Aluminum alloy cube as a mounting fixture to provide 3 or 6 degree-of-freedom (DOF) motion.

DESCRIPTION OF THE RELATED ART

Many devices are subjected to mechanical vibrations during their lifetimes, and vibration testing of devices during the design and manufacturing stages has proven very valuable to improve their expected lifetimes.

The experienced real world vibration usually includes at least three and possibly all six degrees of freedom (DOF), that is, the vibration usually has linear acceleration components along the three orthogonal axes, and angular acceleration components about those axes.

Several vibration test machines have been designed to produce six degrees of freedom vibration. They often use hydraulic actuators to move a test table, on which the test article is mounted. Since each actuator mechanism usually produces motion in a single degree of freedom, each actuator must be coupled to the table with bearings that have five degrees of freedom. In this way, the actuator controls the single degree of freedom of the point on the table where its drive link is connected. The five DOF bearings allow motion in the other five degrees of freedom. With six actuators properly arranged, each controlling a single degree of freedom, all six degrees of freedom of the table can be controlled.

Many actuator and bearing configurations are possible to achieve six degrees of freedom vibration and/or shock. Spherical bearings at each end of the actuator, links with spherical bearings placed between the actuator and the table, or special five degree of freedom bearings that comprise both a sliding and rotating bearing in a single element are examples. These systems are limited in their frequency response by the dynamics of the hydraulic shaker, the table, and any connecting links. A very fundamental limitation to the frequency response comes from the hydraulic shaker.

Typical hydraulic servo valves are limited to 50 or 100 Hz frequency response. U.S. Pat. No. 5,343,752, assigned to Team Corporation, discloses a servo valve and double-acting piston actuator that responds to 1000 to 2000 Hz depending on the size of the actuator. Several multi-degree of freedom systems are disclosed in that patent. Each uses a high frequency valve to produce higher vibration frequencies than previously attainable by a multiple degree of freedom shaker. One of those systems, referred to as the Cube test system, comprises actuators on the inside of the vibration table. This system improves on the frequency response of a six DOF vibration test system, raising the controllable frequency from about 50 Hz for the prior art, to about 250 Hz. Even greater frequency response is desired, so the Cube type system forms the basis upon which the improvements of the present invention are compared.

U.S. Pat. No. 6,860,152 assigned to Team Corporation discloses a vibration test machine referred to as a TENSOR test system comprising a stationary outer frame, a shake table in the form of a mass to which vibration energy is transmitted inside the outer frame, a driven preload piston supported by the outer frame and coupled to one side of the shake table, a passive preload piston supported by the outer frame and coupled to the shake table on a side opposite from the driven preload piston, and an external force generator external to the outer frame and coupled to the driven piston for inducing high frequency vibrational energy to the driven piston which, in turn, transmits that vibration energy to the shake table. The outer frame is constructed from welded magnesium plates as a hollow cube. In one embodiment, a multiple degree of freedom shaker comprises multiple exterior force generators (i.e., 12) each coupled to a corresponding driven preload piston having a related passive preload piston on an opposite side of the shake table. There are 4 exterior force generators coupled to a bottom surface and 2 exterior force generators coupled to each of the lateral surfaces leaving only the top surface available as a mounting surface. The preload piston couplings to the shake table comprise self-aligning hydrostatic pad bearings with 5 DOF, restraining only vertical motion, to accommodate the multiple degrees of freedom vibrational motion induced in the shake table.

Compared to the Cube style multi-axis vibration table, the TENSOR test system has higher frequency response and better table uniformity (less distortion). Electro-dynamic (ED) actuators have better frequency response and better freedom from distortion than even the best electro-hydraulic (EH) shakers; and the smaller, stiffer table of the present invention provides a higher first mode frequency than the Cube test system. This translates into much higher G levels for the test object.

Baughn Engineering offers a Universal Multi-Line System in which five hydrostatic pad bearing are coupled to the bottom surface and four lateral surfaces of a mounting fixture. The bottom bearing and two of the bearings on adjacent lateral surfaces are each coupled via cylindrical drive bars to ED shakers to provide 3 DOF of linear motion. The other two bearings are coupled to tower supports on the other two lateral surfaces to compensate for overturning moments. As shown in FIGS. 1A through 1C, a mounting fixture 100 is hollow cube 102 constructed from 24" welded magnesium plates 104, internally gusseted to minimize the overall weight and maintain strength and stiffness. Each hydrostatic pad bearing extends into an aperture 106 formed in hollow cube 102 and is bolted into alignment holes 108 around the aperture. The mounting fixture 100 is stiff in a vertical direction 110 with respect to the one mounting surface 112 but less so in both lateral directions.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a multi-axis vibration test system that overcomes the problems of existing systems to deliver the required amplitude of linear displacement over the frequency test band in all three axes simultaneously and uniformly over the mounting surface(s) for both commercial and the more stringent military standards.

An embodiment of a multi-axis vibration test system comprises a mounting fixture that supports one or more devices under test (DUT), multiple pad bearings coupled to the mounting fixture, multiple shakers to transfer a linear displacement through the respectively pad bearings to the mounting fixture and a controller configured to drive the shakers to execute a specified vibration test profile. The mounting fixture includes a solid 1-piece block, at least 20 inches per side, and formed of an Aluminum alloy. The solid 1-piece block having formed therein first, second and third bearing recesses in a bottom surface and first and second lateral surfaces, respectively, to receive the pad bearings leaving at least a top surface available as a mounting surface for one or more device DUTs. Each pad bearing allows for transference of linear displacement from a shaker to the mounting fixture along an axis perpendicular to the bearing and allowing for lateral displacement of the mounting fixture in a plane orthogonal to the axis. Each bearing recess is configured to form a continuous mechanical interface between a surface of the bearing recess and a front surface of the pad bearing mounted therein to improve transference of the linear displacement through the bearing to the mounting surface and uniformity across the 3 DOF.

In an embodiment, the solid 1-piece block is cast or forged suitably from an Aluminum alloy that constitutes a medium damping material exhibiting a damping index in the range of 1 to 9.5 and then machined to form the bearing recesses. Exemplary Aluminum alloys include but are not limited to 6061 T6 or A386. The block is typically between 20 inches and 36 inches a side. Ballast may be added to the block to position the center of gravity (Cg) of the solid 1-piece block at the center of the block. Without ballast the Cg is slightly offset from the center of the block.

In an embodiment, third and fourth lateral surfaces of the block provide second and third mounting surfaces, respectively. In an embodiment, the assembly includes only the 3 pad bearings to provide 3 DOF motion. In another embodiment, additional pad bearings (all 5 DOF bearings) are mounted in recesses formed in the bottom surface and first and second lateral surfaces with only the 6 pad bearings providing 6 DOF motion.

In an embodiment, a drive bar is configured to couple each shaker to each pad bearing. The drive bar includes a bull nose adaptor that is coupled to the shaker, an H-frame adapter and a plurality of expansion pins. The H-frame adapter increases the surface between the drive bar and the pad bearing by a factor of 2×. The expansion pins similarly increase the surface area as compared to bolts and increase stiffening by preventing a rocking motion in the direction of vibration. Together the drive bar improves transmission of high frequency (1,000-2,000 Hz) displacement.

In an embodiment, the controller executes a test profile that delivers an amplitude of linear motion over a test frequency range in at least 3 DOF. The test profile is delivered across the entire first mounting surface (and any other mounting surfaces) with less than +/−3 dB variation across each surface for all 3 DOF. In an example, the test profile delivers at least 6 G rms over a test frequency range of at least 20-2,000 Hz.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 6A and 6B are plots of the amplitude response versus drive frequency for a plated Mg mounting fixture and a solid 1-piece Al mounting fixture, respectively.

DETAILED DESCRIPTION OF THE INVENTION

Despite the existence of multi-axis vibration test systems, vibration testing is predominantly still performed using single axis systems. Despite early claims, the multi-axis vibration test systems have not delivered the required amplitude of linear displacement over the required frequency test bands in all three axes simultaneously and uniformly over the mounting surface(s). Although not desirable for testing of commercial devices, the lack of performance is particularly problematic and not acceptable for military grade devices subject to military standards (MIL-STD).

A typical 1-axis system includes a shaker and a mounting fixture on which to mount a device-under-test (DUT). A vibration fixture may be designed and used to mount the specific DUT to the mounting fixture. Three-axis testing may be performed with a couple of different configurations. In one configuration, the mounting fixture is a small (12" or less) solid cube of Aluminum alloy or Magnesium, with Magnesium being the accepted material of choice due to its higher damping index to dampen undesired resonant modes. The DUT can be mounted on the top surface of the cube, a lateral surface of the cube and then rotated 90 degrees on the lateral surface of the cube to vibration test each of the three axes. In another configuration, the shaker sits on a pedestal that has a slip table. When the shaker is in the horizontal axis, the DUT is mounted to the slip table, which is driven by the shaker armature. After the first axis of test, the DUT is removed and the vibration fixture is rotated 90° on the slip table, and the DUT is remounted in the second axis. For the third axis the slip table is detached from the shaker, and the shaker is rotated 900 up in the vertical axis. At this point the vibration fixture is attached directly to the armature, the DUT is remounted again, and the last axis is tested. Depending on the size of the DUT and vibration fixture, the vertical axis may require a different fixture, or the use of a head expander.

3-axis testing using a 1-axis system takes at a minimum three times as long as testing with a 3-axis system, and likely considerably longer due to set-up and having to re-establish other test conditions such as temperature. Furthermore, each axis is tested independently and thus the DUT does not experience 3-axis motion directly. Coupled effects between the axes are not measured.

The present invention provides a multi-axis vibration test system that overcomes the problems of existing systems to deliver the required amplitude of linear displacement over the required frequency test bands in all three axes simultaneously and uniformly over the mounting surface(s) for both commercial and the more stringent military standards.

Figure 1A:
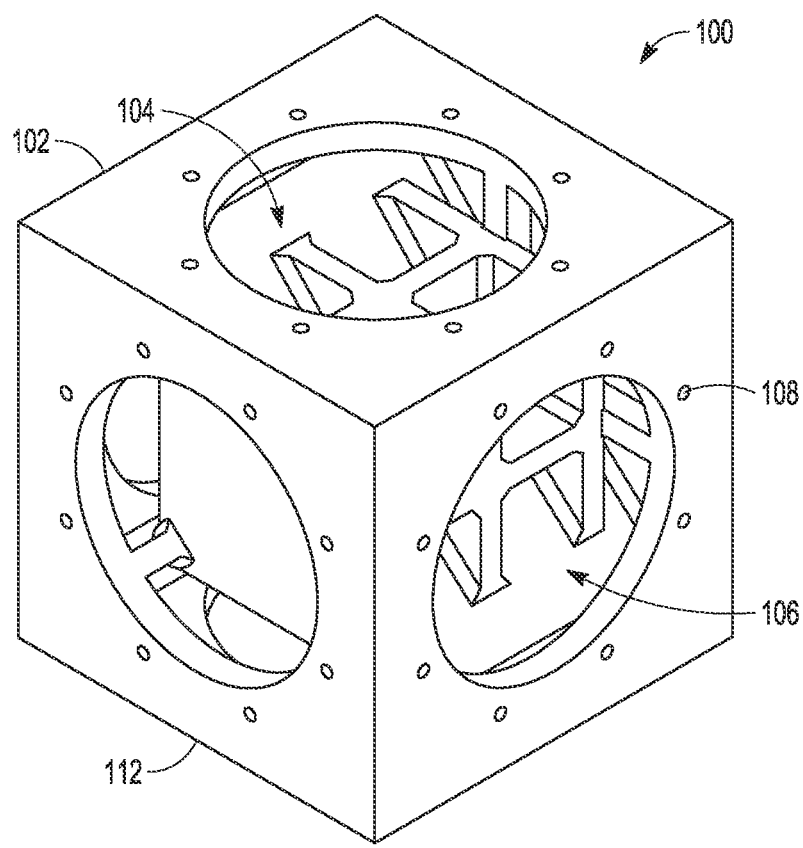
FIGS. 1A through 1C, as described above, are perspective, front and sectional views of a mounting fixture constructed from welded magnesium plates.
Figure 1B:
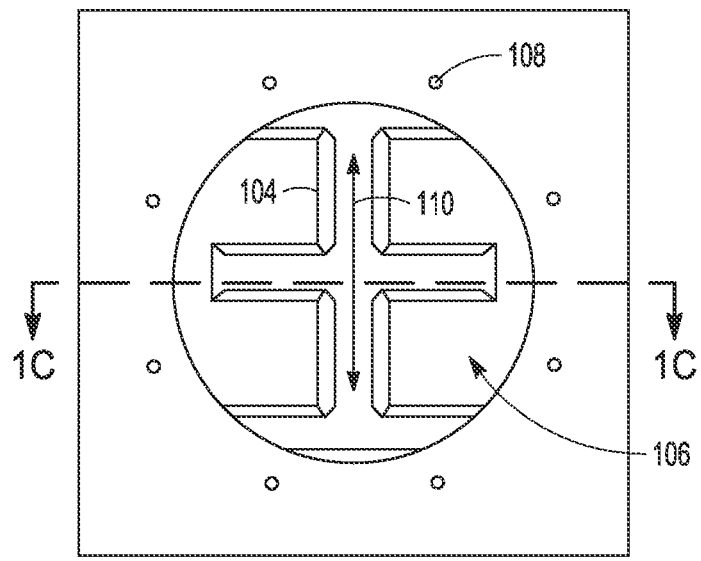
Figure 1C:
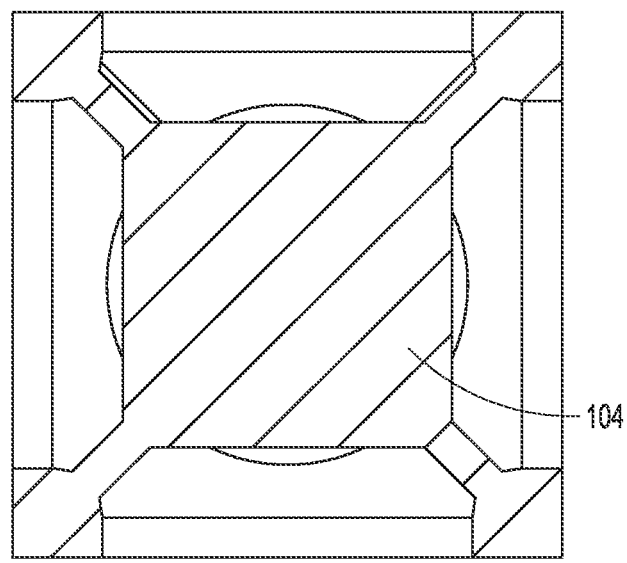

Due to the sheer size of the shakers and other components, 3-axis vibration systems utilize mounting fixtures that are at least 20" per side e.g. a 24" cube. For anything larger than 12", the mounting fixture is a hollow cube having an inner ribbed structure constructed by welding magnesium plates as shown in FIGS. 1A and 1B. In a vibration test system, the acceleration that can be imparted to the DUT is directly related to the driven mass. The greater the mass, the smaller the testable acceleration. Magnesium is a lightweight material. As such, a hollow cube formed from Magnesium plates minimizes the driven mass. Furthermore, Magnesium exhibits a high damping index 50. A high damping index tends to dampen any undesirable resonances or modes induced in the mounting fixture and is generally accepted in the industry to be the material of choice for both its light weight and damping index. Both the TENSOR and Multi-Line System approaches utilize a mounting fixture of this general type.

Testing and analysis have shown that a mounting fixture constructed of welded Magnesium plates induces a number of structural resonance modes and coupled resonance modes within the frequency test band (e.g., 20-2,000 Hz) that either require existing systems to go to extreme measures to compensate for the effects of those modes or that degrade the performance of the system. The welded mounting fixture only exhibits sufficient stiffness in the vertical direction relative to the single mounting surface along the ribs, the lateral directions are not sufficiently stiff. An exemplary 24" hollow cube has been tested and exhibits bending modes at 227 Hz and 417 Hz, bearing access penetration exhibits ovaling at 682 Hz and 713 Hz, and torsional at 988 Hz. The TENSOR system uses 12 ED shakers/bearings, 4 on the bottom surface and 2 each on each lateral surface. In theory, a 6DOF system should only require 6 shakers/bearings. The other 6 shakers are required to compensate for the undesirable effects of these modes to provide a degree of uniformity across the single mounting surface. This requires smaller shakers, thus less force and linear displacement of the mounting fixture and device under test. The cost of the welded Magnesium mounting fixture and the additional shakers/bearings greatly increases overall system cost. The Multi-Line System does not use additional shakers to compensate for these effects. As a result, the Multi-Line System only performs well in the vertical direction over the 20-2,000 Hz test band. In the other two lateral directions the system only performs up to about 500 Hz. Because the system does not drive at or near the Cg of the welded cube, overturning moments are common. Both of these systems provide only a single mounting surface. Within that single mounting surface, the performance is only sufficiently uniform (less than +/−3 dB) within small areas or "sweet spots" on the mounting surface, which greatly limits the size and number of DUT that can be tested and does not satisfy current MIL-STD.

Going against convention, the present invention uses a solid 1-piece block of an Aluminum alloy (at least 20" per side for equal length sides) that is machined to form bearing recesses in the bottom and two adjacent lateral surfaces leaving three surfaces (the top and two lateral surfaces) available as mounting surfaces as the mounting fixture. The solid 1-piece block does not exhibit the rich modal structure of the hollow cube constructed by welding magnesium plates and is stiff in all three directions. The solid 1-piece block may exhibit a $1^{st}$ resonance mode within the frequency test band depending on the upper limit of the band and the size of the block. This $1^{st}$ resonance mode is fairly constant along each of the 3 axes. Furthermore the block does not exhibit the other coupled modes that create non-uniformities in the response within the frequency test band across a mounting surface. The center of gravity (Cg) of the solid block is very close to the true center of the block. As such the axes of motion either pass through or close to the Cg thereby mitigating other moments. Ballast may be used to move the Cg to the true center of the block. Furthermore, a continuous mechanical interface is maintained between the surface of the bearing recess and the front surface of the bearing. This markedly improves the transference of energy from the shaker to the mounting fixture.

Because the solid 1-piece block does not exhibit a rich modal structure in the frequency test band the compelling requirement to use magnesium and its high damping index to dampen the modes is eliminated. Magnesium's high damping index, although required to dampen modes in the hollow cube configurations, also had the deleterious effect of reducing transference of the force or linear displacement from the shaker to the DUT. This was a price that had to be paid. By eliminating these modes, the solid 1-piece block can be formed from a material having a much lower damping index thereby transferring the linear displacement to the DUT more efficiently. The class of Aluminum alloys exhibiting a damping index between 1 and 6 was selected. Pure Aluminum is too soft (weak). This class of Aluminum alloys provides both a low damping index and the capability to be cast or forged into a block of at least 20" per side and machined to form the bearing recesses. Forged Aluminum 6061 T6 and A386 are suitable Aluminum alloys within this class of medium damping materials.

The solid 1-piece block of aluminum is significantly heavier than the hollow cube formed of welded magnesium plates. Aluminum itself is about 30% heavier than magnesium and the solid 1-piece block comprises substantially more material than the hollow cube. In total, a 24" solid 1-piece block of aluminum with the three bearing recesses weighs about 1067 pounds whereas a 24" hollow cube of welded magnesium plates weighs about 750 pounds. The present multi-axis vibration test system may offset for this substantial increase in weight of the mounting fixture in different ways. Compared to the TENSOR system, the current system could eliminate 6 shaker/bearing pairs to achieve 6 DOF. Compared to the Multi-Line System, the current system could eliminate the 2 additional bearings and towers used to compensate for overturning moments.

Figure 2A:
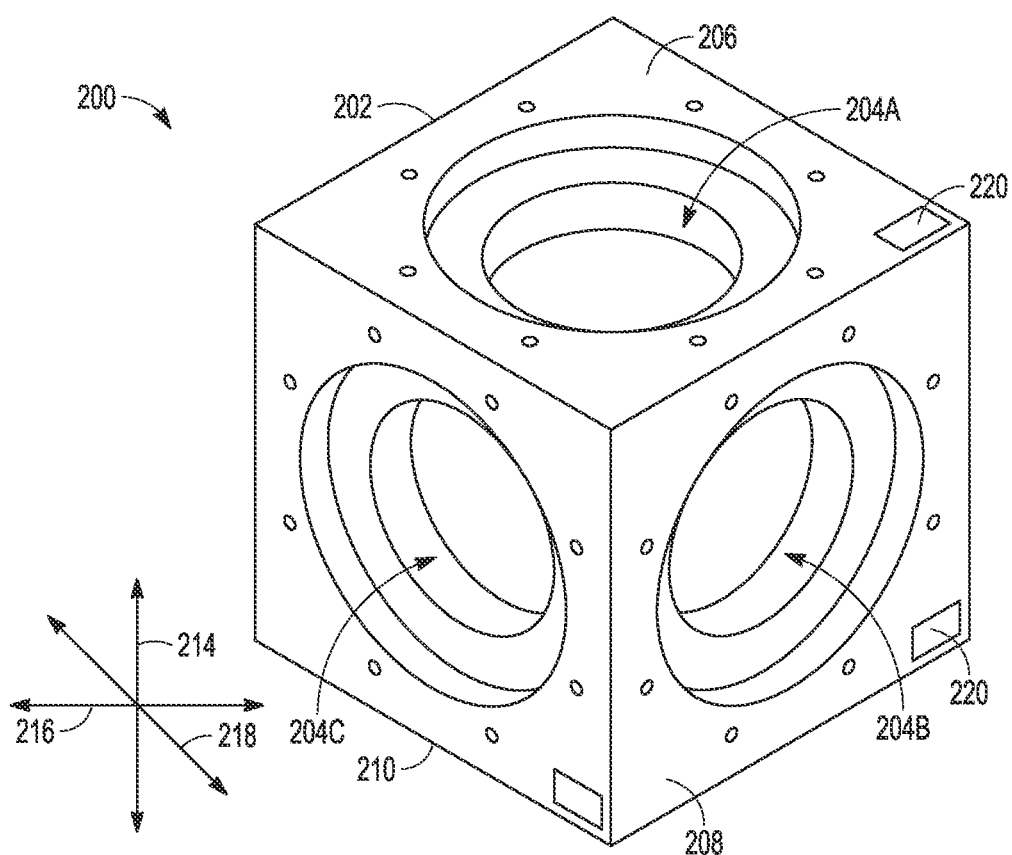
FIGS. 2A through 2C are perspective, front and section views of an embodiment of a mounting fixture in which a solid 1-piece block of Aluminum is machined to form bearing recesses in three surfaces leaving the remaining three surfaces available as mounting surfaces.
Figure 2B:
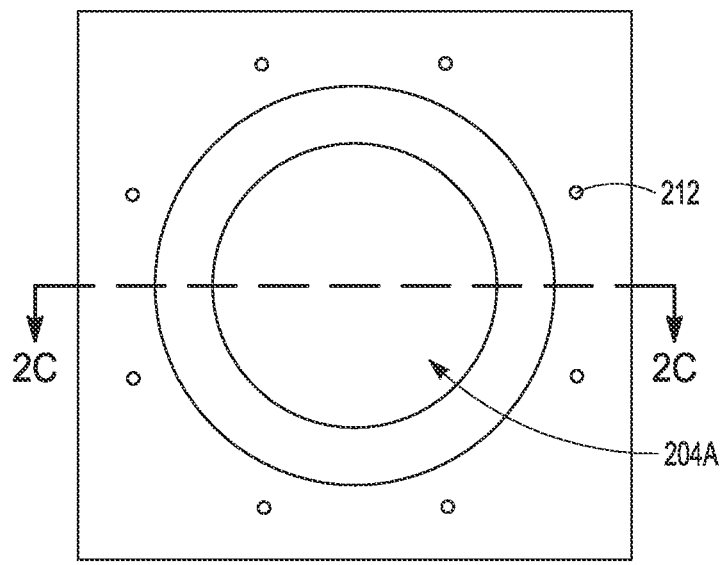
Figure 2C:
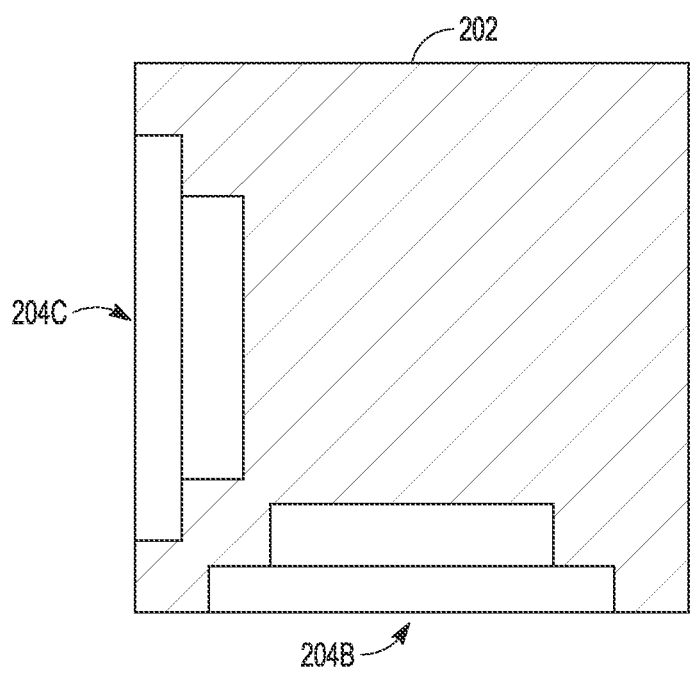

Referring now to FIGS. 2A through 2C, in an embodiment a mounting fixture is a solid 1-piece block 202 forged or cast from an Aluminum alloy such as 6061 T6 or A386 exhibiting a medium damping index between 1 and 9.5. Block 202 is a cube having equal length sides of at least 20" and typically no more than 36". Block 202 is machined to form first, second and third bearing recesses 204A, 204B and 204C in a bottom surface 206 and adjacent first and second lateral surfaces 208 and 210. The recesses are machined to exhibit a shape that is complementary to the shape of the forward portion of a pad bearing to form a continuous mechanical interface between a surface of the bearing recess and a front surface of the pad bearing mounted therein. Alignment holes 212 are machined into the block around the bearing recesses to bold the pad bearing to the mounting fixture. The mounting fixture is stiff in the vertical direction and both lateral directions 216 and 218 with respect to each pad bearing. The three remaining surfaces of the block 202 are available as mounting surfaces for one or more DUT. As will be demonstrated later, each mounting surface exhibits an amplitude response over the test frequency band that is uniform (within +/−3 dB) across the entire extent of the mounting surface and that is consistent for all 3 DOF of motion applied to the mounting fixture. This is performance not provided by existing mounting fixtures for known multi-axis systems.

The formation of the bearing recesses 204A, 204B and 204C in block 202 shifts the center of gravity (Cg) of the mounting fixture slightly away from the true center of block 202. If needed, this can be compensated for by placing ballast 220 on the surface to shift the Cg to the true center of the block. The amount of ballast and placement of the ballast will depend on the number, weight and placement of the one or more DUT on the mounting surface(s).

Figure 3A:
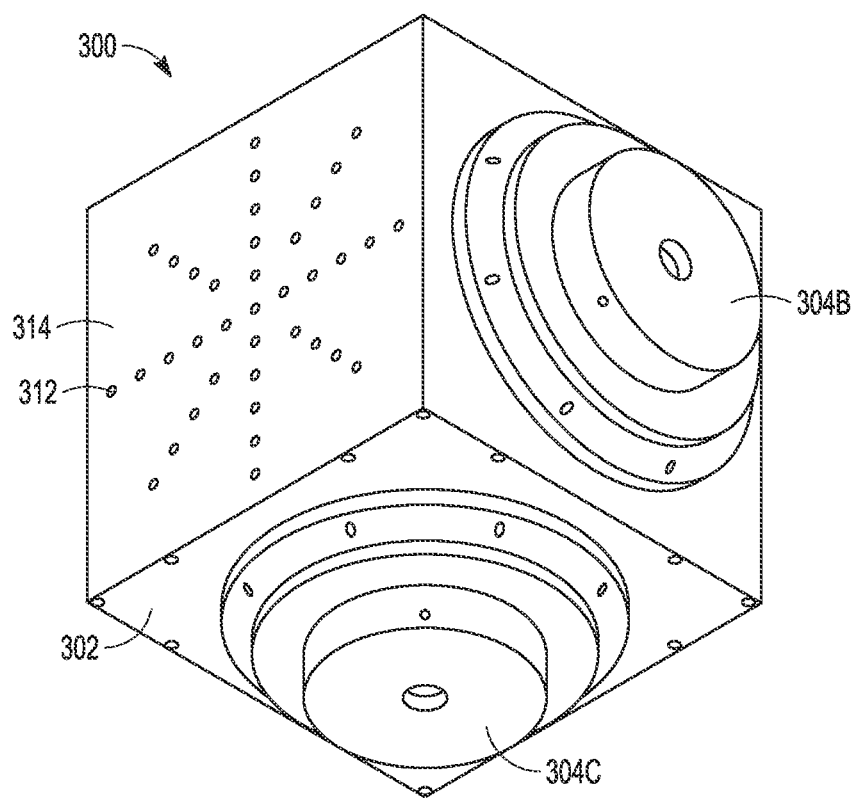
FIGS. 3A and 3B are perspective and front views of the coupler in which three pad bearings are mounted on the mounting fixture for 3 DOF motion.
Figure 3B:
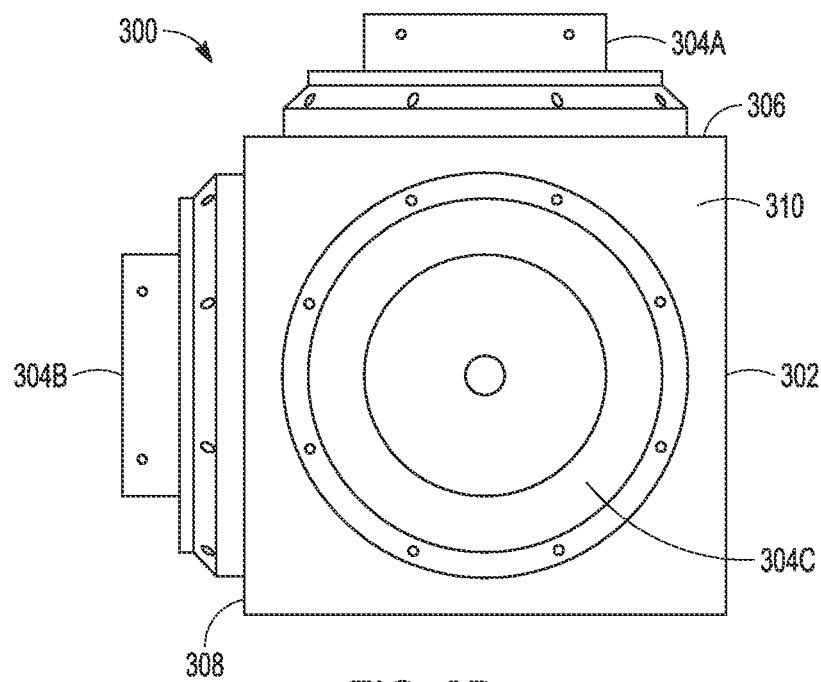

Referring now to FIGS. 3A and 3B, in an embodiment a coupler 300 includes a mounting fixture 302 of the type described above in which 3 pad bearings 304A, 304B and 304C, suitably hydrostatic bearings configured as pad bearings, are bolted onto the mounting fixture on the bottom surface 306 and first and second adjacent lateral surfaces and 310, respectively. Hydrostatic bearings require a flow of bearing oil for active cooling. See Notes 12(b) HYDROSTATIC JOURNAL BEARINGS, rotorlab.tamu.edu Dr. Luis San Andres (2010). Each pad bearing is stiff along an axis perpendicular to the bearing to transfer linear displacement to the mounting fixture and exhibits 2 DOF in a lateral plane to allow the mounting fixture to move in response to linear displacements applied to the other two pad bearings. A mounting surface 314 is shown on the bottom surface of the mounting fixture. Mounting surface 314 is suitably machined with a hole pattern 312 on which to mount one or more DUTs using a vibration fixture designed for the particular DUT. The entire extent of mounting surface 314 is useable area for one large DUT or multiple smaller DUT and will exhibit the same amplitude response across the test frequency band in all 3 DOF. It is critical that a single DUT does not experience a different amplitude response at different locations in the DUT or that multiple DUT do not experience different amplitude responses.

Figure 4:
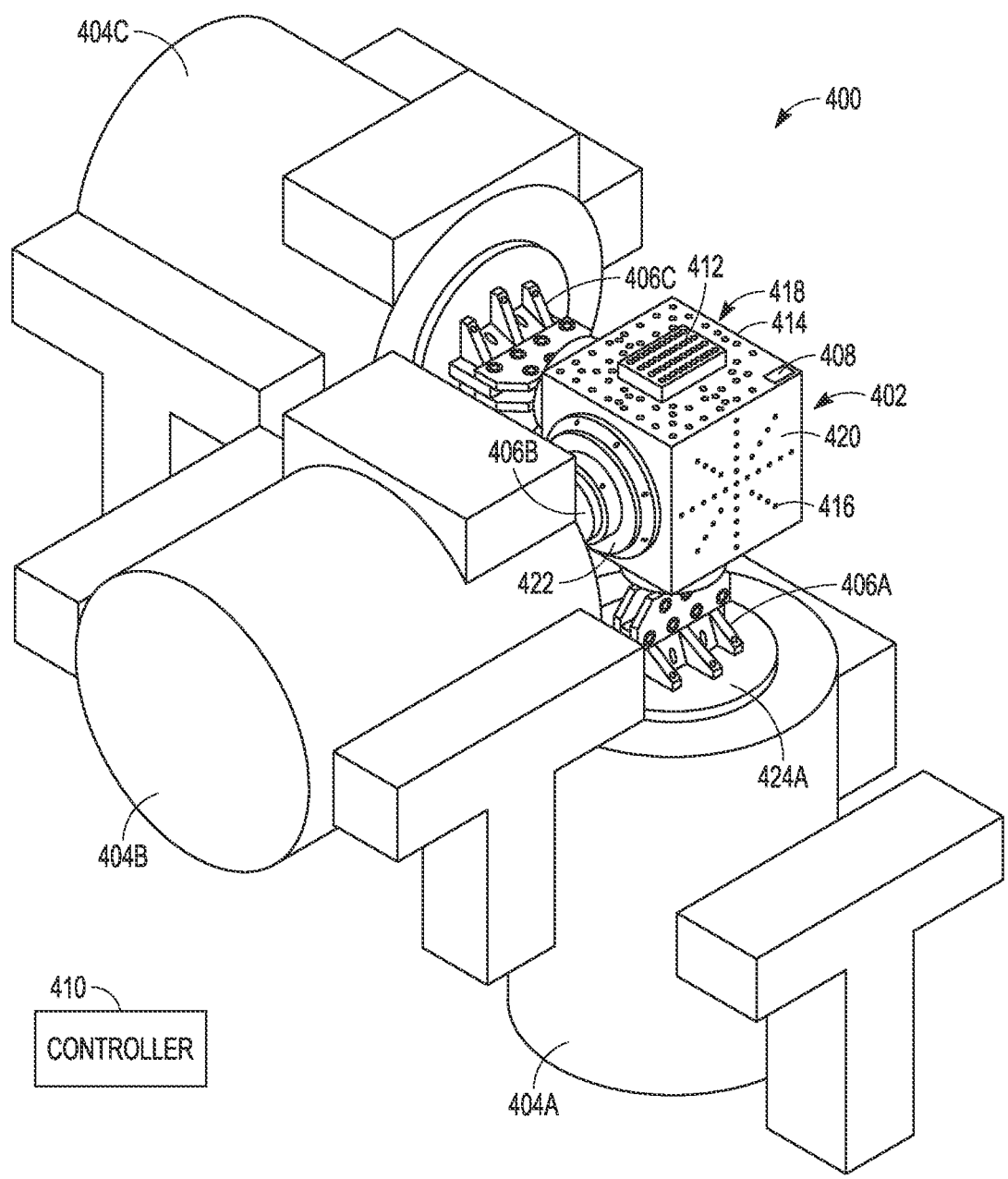
FIG. 4 is a perspective view of an embodiment of a 3-axis vibration test system using the solid 1-piece block of Aluminum as the mounting fixture.

Referring now to FIG. 4, in an embodiment a 3-axis vibration test system 400 includes a coupler 402, three shakers 404A, 404B and 404C that provide for linear displacement over an amplitude and frequency range and three drive bars 406A, 406B and 406C that transfer the linear displacement in 3 DOF to coupler 402, accelerometers positioned on the coupler and a controller 410. One or more DUT 412 are mounted, typically using a vibration fixture, on at least one of the three mounting surfaces 414, 416 and 418. The test system executes a test profile to deliver a linear displacement in 3 DOF over a test frequency range for a given period of time. For example, the system may randomly drive the coupler and the DUT(s) mounted thereon over an amplitude range of at least 6 G rms over a frequency range of 20-2,000 Hz for a period of at least 10 minutes.

As previously described, coupler 402 includes a mounting fixture 420 formed as a solid 1-piece block of cast or forged Aluminum alloy that is machined to define the bearing recesses, alignment holes to mount the pad bearings and the alignment holes to mount the DUT(s) and three hydrostatic pad bearings 422 bolted to the mounting fixture.

The shakers 404A, 404B and 404C are suitably electrodynamic (ED) shakers that each linearly displaces a different shaker armature that is attached to one of the drive bars. For example, shaker 404A displaces shaker armature 424A that is attached to drive bar 406A. A suitable ED shaker can provide linear displacement over a given range e.g. inches peak-to peak, over a given frequency range e.g., at least 20-2,000 Hz at a given force rating e.g., 18,000 LBF. Unholtz-Dickie Corp. produces a K-series Electrodynamic Shaker suitable for use in the multi-axis vibration test system.

Figure 5A:
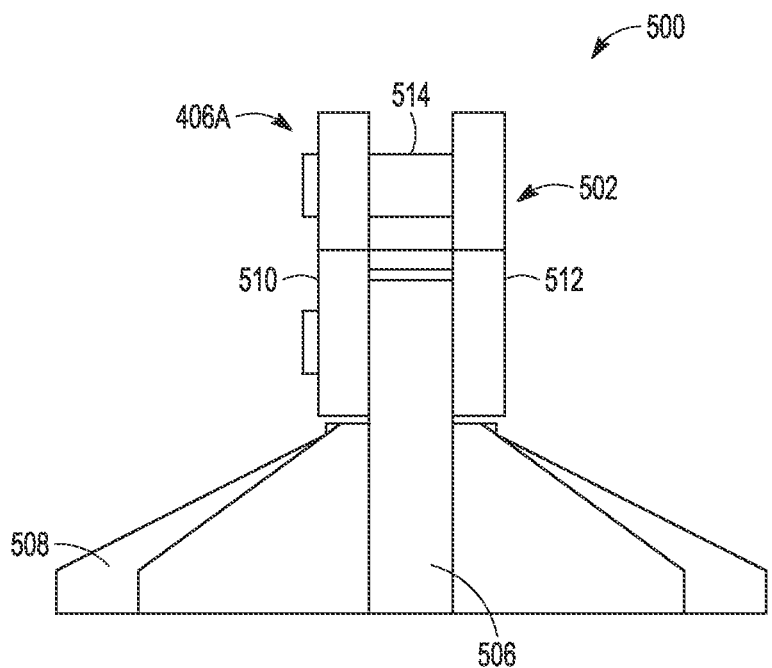
FIGS. 5A and 5B are views of a drive bar that links the electro-dynamic (ED) shaker to the hydrostatic pad bearing to transfer linear motion through the bearing to the mounting fixture.
Figure 5B:
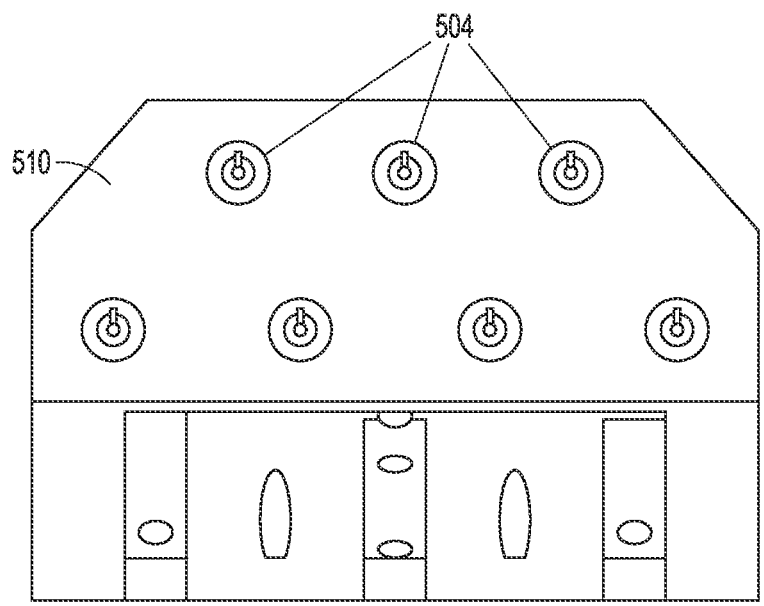

Referring now to FIGS. 4 and 5A-5B, a drive bar 406A is configured to transfer the linear displacement of the shaker armature 424A to mounting fixture 420. In known test systems, cylindrical drive bars have been used. Testing showed that these cylindrical drive bars did not perform well at the higher end of the frequency range and did not effectively transfer the linear displacement to the pad bearings. To overcome these limitations, an embodiment of the drive bar 406A includes a bullnose adapter 500, an H-frame adapter 502 and expansion pins 504. Bullnose adapter 500 includes a plurality of legs 506 that are attached to opposite sides of a plate 508 and bolted to the shaker armature. The H-frame adapter 502 includes a pair of plates 510 and 512 that are connected with a crossbar 514 (in the shape of an "H") and attached to bullnose adapter plate 508. Expansion pins 504 extend through plates 510 and 512 and are coupled to the hydrostatic pad bearing.

Existing designs utilize a cylindrical shaft, which doesn't transmit high frequency (1000-2000 Hz) energy well due to the small surface area between the shaft and hydrostatic bearing pad. The new design, utilizes an "H-Shape" which increase the surface area by a factor of 2×. This will allow for an increase in high frequency transmissibility across that joint. The H-Shape design incorporates features that have been utilized in the vibration field for decades. Specifically, an H-shaped design has been utilized to connect the shaker armature to the slip table. The H-Shape design will improve the results of any cube attached to the system. Additionally, the expansion pins are superior to bolted connections for two reasons. First, the surface area of the expansion pins is much larger than bolts. Second, the expansion pins have a mechanism that increases in the circumferential direction when tightened. This creates a stiffening affect by preventing a rocking motion in the direction of vibration. Both result in an improved high frequency energy transfer.

Controller 410 outputs 0-10V a low voltage drive signal e.g., 0-10V, to the shaker amplifiers, which amplify and apply a high voltage drive signal to shaker armature causing the armature to be displaced along an axis at the drive frequency (like a speaker). The controller receives feedback from the accelerometers in a closed loop to adjust the drive signal so that the actual displacement on the mounting surface(s) of the mounting fixture match the specified test profile. If the transmissibility between the shaker output and the accelerometer responses is poor e.g. large losses, non-uniformity across a mounting surface, non-uniformity across the 3 DOF, the controller and shakers will have to work much harder to implement the specified test profile. Forming the mounting fixture 420 from a solid 1-piece block of Aluminum alloy as previously described greatly improves transference of the linear displacement from the shaker to the mounting surface across all 3 DOF and provides uniformity across the entire extent of the mounting surface(s) over the entire frequency range and all 3 DOF.

As previously described, the Baugh Engineering Multi-Line System used two additional bearings two address overturning moments. The same approach could be used with the current mounting fixture 420 leaving only a single mounting surface. However, because the Cg of the solid 1-piece block is inherently closer to the true center of the block and may be easily corrected using ballast, the overturning moments should be less problematic. Given this, another approach is to forgo the additional bearings preserving the three mounting surfaces by installing bending gauges on the shaker armature. The responses of the bending gauges would become part of the closed-loop control system.

Figure 6B:
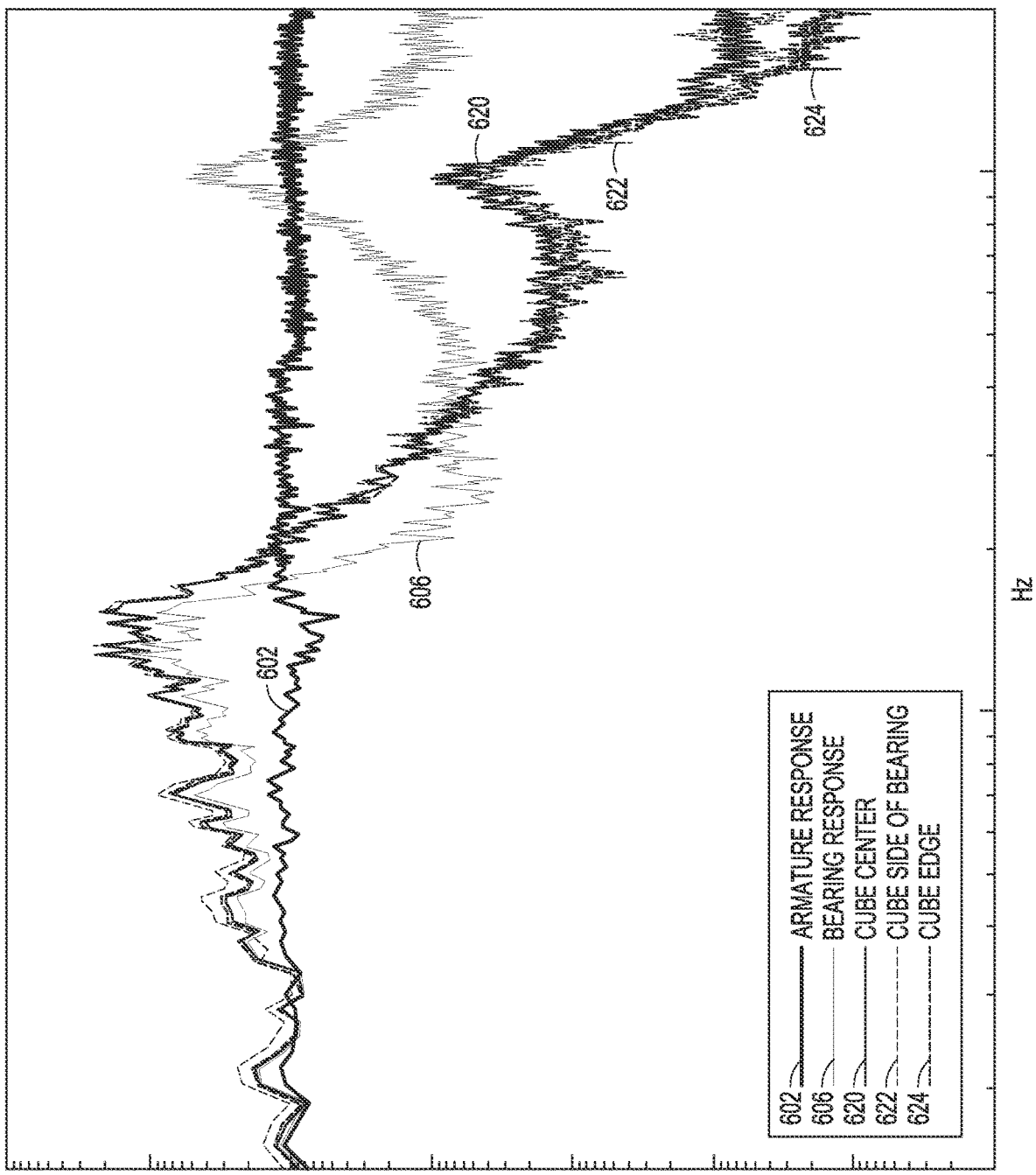

Referring now to FIGS. 6A and 6B, both a hollow cube formed of welded Magnesium plates of the type used in know 3-axis vibration test systems and a solid 1-piece cube formed of forged or cast Aluminum alloy in accordance with an embodiment of the present invention were driven along a single axis with the amplitude responses of the shaker armature, shaker side of the pad bearing and the cube side of the bearing, cube center and cube measured over a frequency range of 20-2,000 Hz. Each of the cubes are 24" per side. Accelerometers were mounted on the shaker armature, the shaker side of the pad bearing and on the cube at the bearing, at cube center and at the far edge of the cube to measure the amplitude responses.

As expected, the armature responses 600 and 602 for the hollow cube and the solid cube, respectively, are flat across the frequency range. Ideally these flat responses would be transferred identically across the entire extent of each mounting surface. The pad bearing exhibits a modal structure that appears as resonance modes in bearing responses 604 and 606. If the hollow and solid cubes were ideal, the bearing responses would transfer identically to each of the measured cube responses. Neither is ideal but as the data shows the solid cube performs much better in a number of critical parameters. For the hollow cube of welded Magnesium plates, the cube responses 610, 612 and 616 at the bearing, at cube center and at the far edge of the cube show a rich modal structure that starts at about 700 Hz and continues to 2,000 Hz. The responses show considerable variation across the extent of the mounting surface of the cube. By contrast, for the solid 1-piece cube formed of Aluminum allow, the cube responses 620, 622 and 626 at the bearing, at cube center and at the far edge of the cube show only a $1^{st}$ resonance mode at about 1,700 Hz. Furthermore, the responses are highly uniform (less than +/−3 dB variation) across the extent of the mounting surface of the cube across the entire frequency range.

In addition, the hollow cube was tested along the stiff vertical axis relative to the one mounting surface. If the plots for the other two lateral directions were shown, they would reveal far worse performance due to the lack of stiffness in the hollow cube in those directions. The responses would fall off and exhibit considerable non-uniformity across the mounting surface above 500 Hz. By contrast, the solid cube exhibits the same stiffness, hence the same performance in all 3 DOF. This is critical to facilitate using the 3-axis vibration test system to simultaneously test all 3 DOF.

Figure 7:
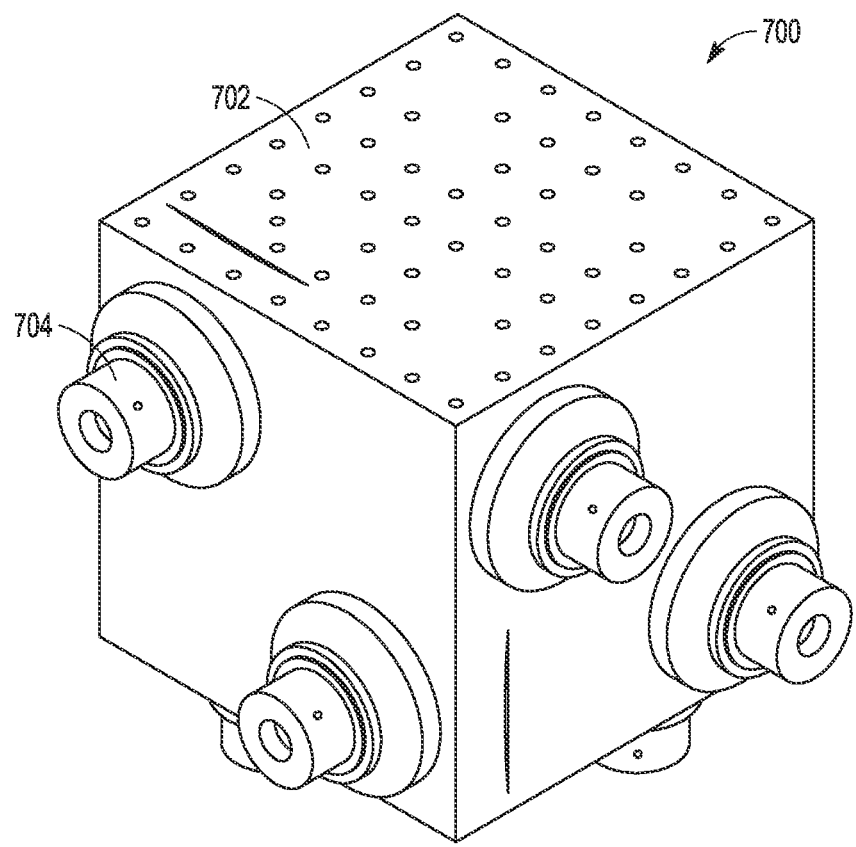
FIG. 7 is a perspective view of the coupler in which six pad bearings are mounted on the mounting fixture for 6 DOF motion.

Referring now to FIG. 7, a 6 DOF coupler (linear translation in XYZ and yaw/pitch/roll) 700 includes a mounting fixture 702 cast or forged from a solid 1-piece block of an Aluminum allow and machined to form 6 bearing recesses in a bottom surface and a pair of adjacent lateral surfaces and 6 hydrostatic pad bearings 704 bolted to the mounting fixture 702 to form continuous mechanical interfaces with the surfaces of the bearing recesses. The pad bearings 704 are each coupled via a drive bar to an ED shaker. A controller implements a closed loop multi-input multi-output feedback system to execute a 6 DOF profile. Use of a solid 1-piece block of Aluminum alloy as the mounting fixture allows the system to use only 6 ED shakers and still achieve high transference of the linear displacement uniformly over the entire extent of each of the 3 mounting surfaces and uniformly over all 6 DOF.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A coupler for a multi-axis vibrational test system, said assembly comprising:
   a mounting fixture including a solid 1-piece block having length, width and depth dimensions of at least 20×20×20 inches, respectively, and formed of an Aluminum alloy exhibiting, said solid 1-piece block having formed therein first, second and third bearing recesses in a bottom surface of at least 20 inches by 20 inches and first and second lateral surfaces of at least 20 inches by 20 inches, respectively, leaving at least a top surface available as a first mounting surface for one or more device under test (DUT); and
   first, second and third pad bearings mounted in said first, second and third bearing recesses, each said pad bearing allowing for transference of linear displacement to the block along an axis perpendicular to the pad bearing and allowing for lateral displacement of the mounting fixture in a plane orthogonal to the axis.

2. The coupler of claim 1, wherein the solid 1-piece block is at most 36 inches per side.

3. The coupler of claim 1, wherein said Aluminum alloy comprises forged 6061 T6 Aluminum or A386 Aluminum.

4. The coupler of claim 1, wherein the solid 1-piece block has been cast or forged to form the block and machined to form the first, second and third bearing recesses.

5. The coupler of claim 1, wherein each bearing recesses is configured to form a continuous mechanical interface between a surface of the bearing recess and a front surface of the pad bearing mounted therein.

6. The coupler of claim 1, wherein said solid 1-piece block further comprises third and fourth lateral surfaces available as second and third mounting surfaces, respectively.

7. The coupler of claim 6, wherein said solid 1-piece block comprises only the first, second, and third bearing recesses and the first, second and third bearings mounted therein to transfer 3 degree of freedom (DOF) motion to the mounting fixture and DUT mounted thereon.

8. The coupler of claim 6, wherein said solid 1-piece block further comprises:
   fourth, fifth and sixth bearing recesses formed in the bottom surface and first and second lateral surfaces, respectively; and
   only fourth, fifth and sixth pad bearings mounted in said fourth, fifth and sixth bearing recesses, respectively,
   wherein said first, second, third, fourth, fifth and sixth pad bearings transfer 6 degrees of freedom (DOF) motion to the mounting fixture and DUT mounted thereon.

9. The coupler of claim 1, further comprising:
   ballast on the bottom surface and first and second lateral surfaces to position the center of gravity (Cg) of the solid 1-piece block at the center of the block.

10. The coupler of claim 1, wherein the Aluminum alloy exhibits a damping index of between 1 and 9.5.

11. A multi-axis vibrational test system, comprising:
    a mounting fixture including a solid 1-piece block having length, width and depth dimensions of at least 20×20×20 inches, respectively, and formed of an Aluminum alloy, said solid 1-piece block having formed therein first, second and third bearing recesses in a bottom surface of at least 20 inches by 20 inches and first and second lateral surfaces of at least 20 inches by 20 inches, respectively, leaving at least a top surface available as a first mounting surface for one or more device under test (DUT);

first, second and third pad bearings mounted in said first, second and third bearing recesses, each said pad bearing allowing for transference of linear displacement to the mounting fixture along an axis perpendicular to the pad bearing and allowing for lateral displacement of the mounting fixture in a plane orthogonal to the axis;

first, second and third shakers coupled to the first, second and third bearings and configured to provide linear displacement in three degrees of freedom; and a controller configured to control said first, second and third shakers to provide simultaneous multi-axis linear displacement of the mounting fixture and any DUT mounted thereon in at least three degrees of freedom (DOF).

12. The multi-axis vibration test system of claim 11, wherein said solid 1-piece block further comprises third and fourth lateral surfaces available as second and third mounting surfaces, respectively, wherein said solid 1-piece block comprises only the first, second, and third bearing recesses and the first, second and third bearings mounted therein to transfer 3 degree of freedom (DOF) motion to the mounting fixture and DUT mounted thereon.

13. The multi-axis vibration test system of claim 11, wherein said solid 1-piece block further comprises third and fourth lateral surfaces available as second and third mounting surfaces, respectively, wherein said solid 1-piece block further comprises fourth, fifth and sixth bearing recesses formed in the bottom surface and first and second lateral surfaces, respectively and only fourth, fifth and sixth pad bearings mounted in said fourth, fifth and sixth bearing recesses, respectively, wherein said first, second, third, fourth, fifth and sixth pad bearings are configured to transfer 6 degrees of freedom (DOF) motion to the mounting fixture and DUT mounted thereon.

14. A multi-axis vibration test system, comprising:
a mounting fixture including a solid 1-piece block of at least 20 inches per side and formed of an Aluminum alloy, said solid 1-piece block having formed therein first, second and third bearing recesses in a bottom surface and first and second lateral surfaces, respectively, leaving at least a top surface available as a first mounting surface for one or more device under test (DUT);

first, second and third pad bearings mounted in said first, second and third bearing recesses, each said pad bearing allowing for transference of linear displacement to the mounting fixture along an axis perpendicular to the pad bearing and allowing for lateral displacement of the mounting fixture in a plane orthogonal to the axis;

first, second and third shakers coupled to the first, second and third bearings and configured to provide linear displacement in three degrees of freedom; and a controller configured to control said first, second and third shakers to provide simultaneous multi-axis linear displacement of the mounting fixture and any DUT mounted thereon in at least three degrees of freedom (DOF), wherein the controller is configured to deliver a test profile across the entire first mounting surface with less than +/−3 dB variation in amplitude across a test frequency range.

15. The multi-axis vibration test system of claim 14, wherein the controller is configured to deliver the test profile of at least 6 G rms over e the test frequency range of at least 20-2,000 Hz in at least 3 DOF.

16. A multi-axis vibration test system, comprising:
a mounting fixture including a solid 1-piece block of at least 20 inches per side and formed of an Aluminum alloy, said solid 1-piece block having formed therein first, second and third bearing recesses in a bottom surface and first and second lateral surfaces, respectively, leaving at least a top surface available as a first mounting surface for one or more device under test (DUT);

first, second and third pad bearings mounted in said first, second and third bearing recesses, each said pad bearing allowing for transference of linear displacement to the mounting fixture along an axis perpendicular to the pad bearing and allowing for lateral displacement of the mounting fixture in a plane orthogonal to the axis;

first, second and third shakers coupled to the first, second and third bearings and configured to provide linear displacement in three degrees of freedom;

a drive bar that couples each shaker to each pad bearing, said drive bar including a bull nose adapter configured for coupling to the shaker; an H-frame adapter connected to the bull nose adapter; and a plurality of expansion pins that connect the H-frame adapter to the pad bearing; and a controller configured to control said first, second and third shakers to provide simultaneous multi-axis linear displacement of the mounting fixture and any DUT mounted thereon in at least three degrees of freedom (DOF).

17. A mounting fixture for a 3-axis vibrational test system, said mounting fixture comprising:
a solid 1-piece block having equal length sides in length, width and depth of between 20 and inches per side forged or cast of an Aluminum alloy exhibiting a damping index in the range of 1 to 9.5, said solid 1-piece block having machined therein first, second and third bearing recesses in a bottom surface of at least 20 inches by 20 inches and first and second lateral surfaces of at least 20 inches by 20 inches, respectively, leaving a top surface and third and fourth lateral surfaces available as first, second and third mounting surface for one or more device under test (DUT).

18. The mounting fixture of claim 17, wherein each bearing recesses is configured to form a continuous mechanical interface between a surface of the bearing recess and a front surface of a pad bearing mounted therein.

19. The mounting fixture of claim 17, further comprising:
ballast on the bottom surface and first and second lateral surfaces to position the center of gravity (Cg) of the solid 1-piece block at the center of the block.

20. The mounting fixture of claim 17, wherein said block comprises only said first, second and third bearing recesses to provide 3 degree-of-freedom (DOF) motion.

21. The mounting fixture of claim 17, further comprising:
fourth, fifth and sixth bearing recesses formed in the bottom surface and first and second lateral surfaces, respectively, to provide 6 degrees of freedom (DOF) motion.

* * * * *

UNITED STATES PATENT AND TRADEMARK OFFICE
CERTIFICATE OF CORRECTION

| | |
|---|---|
| PATENT NO. | : 11,460,370 B2 |
| APPLICATION NO. | : 17/176954 |
| DATED | : October 4, 2022 |
| INVENTOR(S) | : Connolly et al. |

It is certified that error appears in the above-identified patent and that said Letters Patent is hereby corrected as shown below:

In the Specification

In Column 4, Line 55, delete "900" and insert --90°-- therefor

In Column 6, Line 52, after "fixture", insert --200--

In Column 6, Line 66, after "direction", insert --214--

In Column 7, Line 22, after "lateral surfaces", insert --308--

In Column 7, Line 47, after "accelerometers", insert --408--

In Column 8, Line 1, before "inches", insert --3--

In the Claims

In Column 12, Line 3, in Claim 15, after "over", delete "e"

In Column 12, Line 39, in Claim 17, after "20 and", insert --36--

Signed and Sealed this
Twenty-second Day of August, 2023

Katherine Kelly Vidal
*Director of the United States Patent and Trademark Office*